United States Patent [19]

Wallace et al.

[11] Patent Number: 4,467,565
[45] Date of Patent: Aug. 28, 1984

[54] ROTARY AND ORBITAL SANDER

[75] Inventors: William K. Wallace, Barneveld; David A. Giardino, Deerfield; Joseph R. Groshans, Clinton, all of N.Y.

[73] Assignee: Chicago Pneumatic Tool Company, New York, N.Y.

[21] Appl. No.: 404,642

[22] Filed: Aug. 2, 1982

[51] Int. Cl.³ .............................................. B24B 23/04
[52] U.S. Cl. .............................................. 51/170 MT
[58] Field of Search ....... 51/170 MT, 170 TL, 170 R, 51/169, 120, 177, 175; 15/49 R, 22 R, 22 A, 97 R

[56] References Cited

U.S. PATENT DOCUMENTS

| 2,796,704 | 6/1957 | Moore | 51/170 MT |
|---|---|---|---|
| 3,205,622 | 9/1965 | Leveque | 51/170 R |
| 3,287,859 | 11/1966 | Leveque | 51/170 R |
| 3,520,090 | 7/1970 | Lee | 51/170 MT |
| 3,857,206 | 12/1974 | Heffran, Jr. | 51/170 MT |

Primary Examiner—Roscoe V. Parker
Attorney, Agent, or Firm—Stephen J. Rudy

[57] ABSTRACT

A rotary orbital sander including a motor housing enclosing a motor, a drive shaft rotatable by the motor, which drive shaft has an off-set projecting portion, a pinion gear housing affixed to the motor housing, a carrier supported upon the shaft off-set projecting portion by two parallel arranged ball bearings, a sanding pad assemblage removably attached to the carrier, intermeshing spur gears arranged on the pinion gear housing and the carrier, a handle arranged for conduction of pressurized pneumatic medium to the motor, a throttle valve for regulation of pneumatic medium flow to the motor, a valve in the handle for cut-off of pneumatic medium to the throttle value, and a counter-balance weight affixed to the shaft off-set projecting portion, said weight being positioned so that its center of gravity of rotation is in the same plane as the center of gravity of rotation of—the carrier, the carrier supporting bearings and a sanding pad assembly attached to the carrier—said pinion gear housing having a circular cavity surrounding the carrier which is engageable by the carrier as it revolves, to provide rotational support for the carrier.

4 Claims, 5 Drawing Figures

ROTARY AND ORBITAL SANDER

BACKGROUND OF THE INVENTION

This invention relates to an improvement in a rotary orbital sander of the type wherein the sanding pad has compound rotary and orbital movements.

Tools of the type with which this invention is concerned are disclosed in the patents of T. J. Leveque U.S. Pat. No. 3,205,622, Sept. 14, 1965 and U.S. Pat. No. 3,287,859, Nov. 29, 1966, and the patent of E. B. Heffran, U.S. Pat. No. 3,857,206, Dec. 31, 1974.

The tools of the Leveque patents provide a counterbalance means having a center of gravity which is not in the plane of rotation of the center of gravity of the rotating unbalanced mass of the tool. Accordingly, a complex compound motion is introduced by rotational unbalance causing operator discomfort.

The tool of the Heffran patent has an exposed orbiting carrier member, which can cause harm to the tool operator or damage if contact is made with an object in the vicinity of the work piece.

The tool of the present invention avoids the aforementioned short-comings of the tools of the Leveque and Heffran patents. In addition, the tool of the present invention has features not shown or suggested in either of these two patents, namely, a rolling contact between the rotating sanding pad carrier member and a circular cavity integral with the motor housing which arrangement serves to provide additional rigidity to the tool, and a double antifriction bearing arrangement for the carrier member providing increased rigidity and stability to the tool. Another feature is a shutoff valve operable to disrupt line pressure to the tool so that the tool cannot be inadvertently started and cause harm to personnel or damage to property.

A prime object of this invention is to provide a rotary orbital sander tool having compound rotary and orbital sanding pad movement, which tool has means for balancing the rotary parts to provide smooth, minimal vibration operation.

A further object is to provide a rotary obital sander tool which maximizes the rigidity and stability of the sanding pad carrier.

Still another object is to provide a rotary orbital sanding tool having means to prevent inadvertent starting of the tool.

These and further objects and features of the invention will be evident from the following disclosure including drawings wherein.

Figure 1:
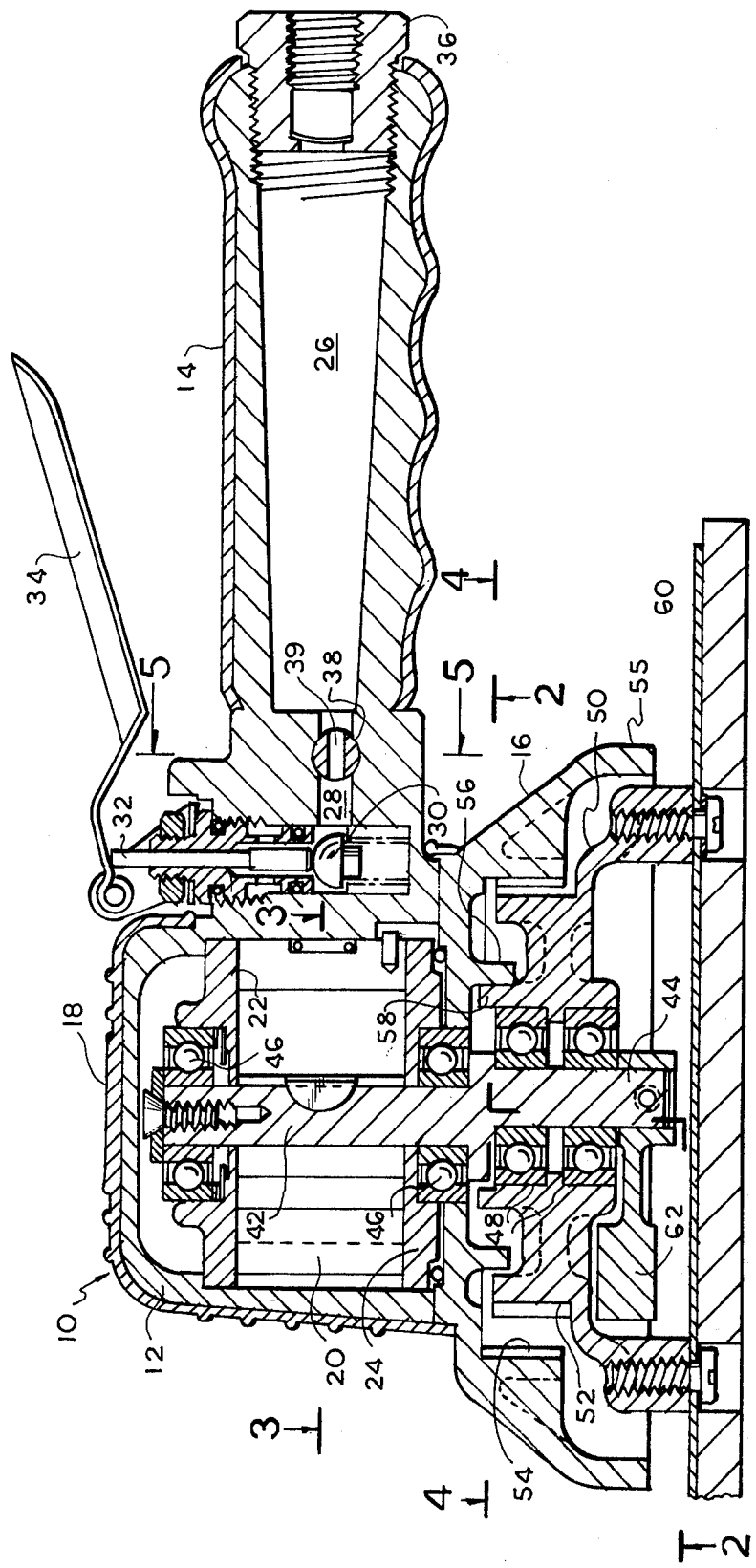
FIG. 1 is a longitudinal cross sectional view of an embodiment of the invention.
Figure 2:
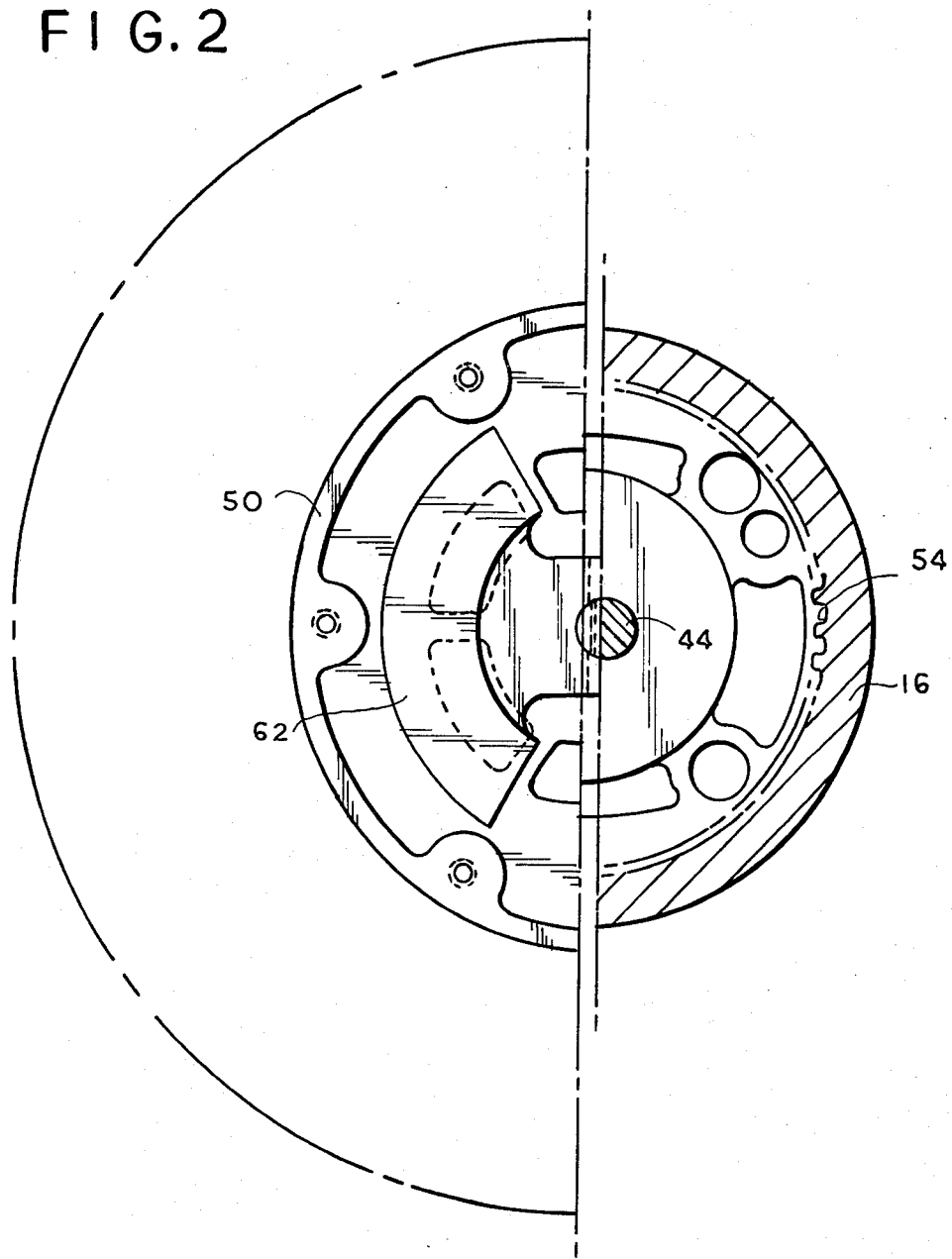
FIG. 2 is a section view generally as seen from line 2—2 in FIG. 1.
Figure 3:
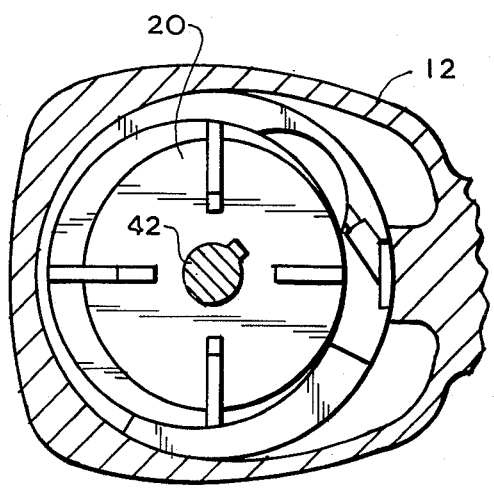
FIG. 3 is a section view generally as seen from line 3—3 in FIG. 1.
Figure 4:
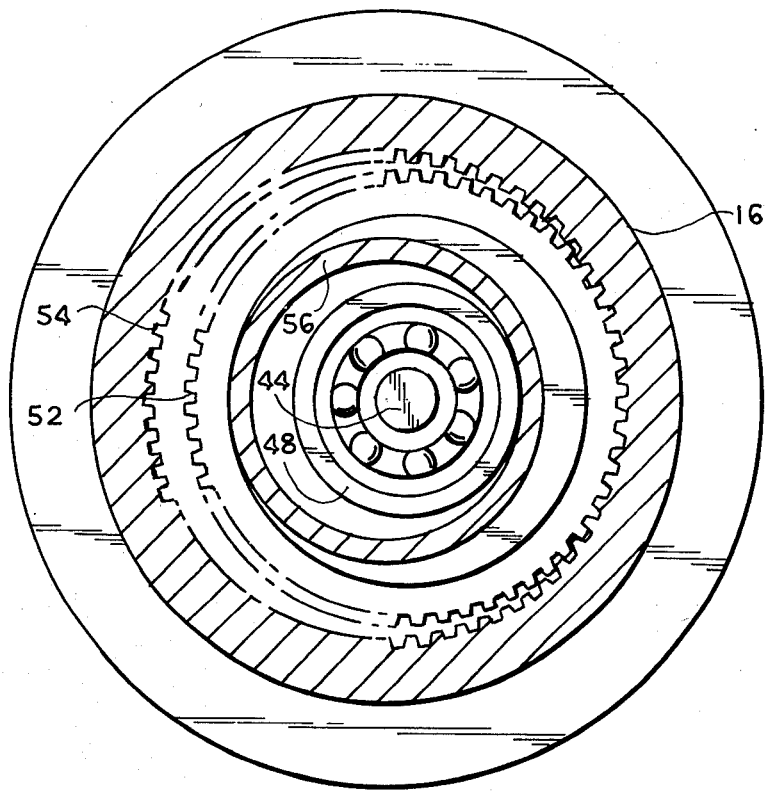
FIG. 4 is a section view generally as seen from line 4—4 in FIG. 1.

Referring now to the drawings, FIG. 1 illustrates, in longitudinal cross-section, a rotary sander tool 10 embodying the invention, which includes a motor housing 12 to which is affixed a handle 14, and a pinion gear housing 16. A cover 18 encloses the motor housing 12, while a pneumatic motor having a rotor 20 end plates 22 and 24, are arranged within the motor housing. The motor has sliding vanes and passageway means (not shown) which conduct pneumatic medium flowing through passageways 26, 28 in the handle 14 to the rotor and vanes to cause rotation of the motor. A spring biased throttle valve 30, is arranged to be unseated by a plunger 32 when a throttle lever 34 is depressed. A pipe connector 36 is affixed to the end of the handle 14 for attachment to a hose (not shown) which conducts pressurized pneumatic medium to the tool. The arrangement so far described is typical of sander tool designs known in the art.

Figure 5:
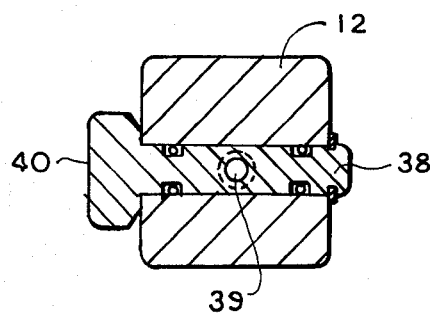
FIG. 5 is a section view generally as seen from line 5—5 in FIG. 1.

A rotary valve 38, having a center passageway 39, is arranged to regulate flow of pneumatic medium through the passageway 28, which valve is rotated by an integral knob 40 as best seen in FIG. 5. When valve 38 is in position to restrict flow of pneumatic medium in the passageway 28, the tool is rendered inactive, i.e., depressing the throttle lever 34 will have no effect. In such manner the tool is protected against activation by inadvertent depression of the throttle lever.

A drive shaft 42 is secured to the rotor 20, the lower projecting end being concentrically offset to provide an eccentric for rotary and orbital operation of the sanding pad, as will be apparent hereinafter. A pair of ball bearings 46 are arranged to provide stabilized rotation of the rotor 20.

Mounted upon shaft end 44 are a pair of ball bearings 48 arranged to support a carrier member 50, having pinion gears 52 arranged about a periphery thereof. Pinion gears 52 mesh with ring gears 54 formed on an inner periphery of the pinion gear housing 16. The teeth of the gears 52 and 54 are alike for operative intermeshing. It will be seen that the eccentric movement provided by the offset projecting end 44 of the drive shaft, will be virtue of intermeshing gears 52 and 54, cause rotary and orbital movement of the carrier member 50. A downwardly projecting portion 55 of the gear housing 16 prevents contact with hands of the operator or objects in the vicinity by the rotating carrier member 50.

The eccentricity, gear ratio and size of the gears 52 and 54, are interdependent upon one another in the following relationship for a fixed ring gear design:

Number of Teeth Ring Gear (54) =

$$\frac{2 \times \text{Eccentricity}}{\text{Pitch (Gearing)}} \times (\text{Gear Ratio} + 1)$$

Number of Teeth Pinion Gear (52) =

$$\text{Number of Teeth Ring Gear (54)} - \frac{2 \times \text{Eccentricity}}{\text{Pitch}}$$

$$\text{Gear Ratio} = \frac{(\text{Number of Teeth Fixed Ring Gear} \times \text{Pitch})}{2 \times \text{Eccentricity}} - 1$$

In the illustrated embodiment the pinion gear 52 has 46 teeth, while the gear 54 has 50 teeth.

The gear housing 16 as an axially arranged circumferential cavity 56 adapted to provide rolling engagement for a circular projection 58 formed on the carrier member 50. Such an arrangement provides additional support for the carrier member 50 during its rotary and orbital movement.

Removably affixed to the lower end of the carrier member is a circular sanding pad assembly 60.

A counter balancing weight 62 is affixed to the offset shaft projection 44, the centerline of said weight coinciding with the axial lines of the drive shaft portions 42 and 44. In such manner, the center of gravity of the weight 62 is diametrically opposed to the effective center of gravity of the rotating parts, namely, gear housing 16, bearings 48, eccentric shaft 44, and the sanding pad assembly 60. The position of the weight 62 provides that the plane of rotation of the weight coincides with the plane of rotation of the rotating parts, thereby avoiding any "couple" or "moment" effect as results when such planes of rotation do not coincide. The dimensions of the counter-balancing weight 52 will vary in accordance with the size of the tool, i.e., unbalanced moving parts, however, such can be determined by application of well known design principles.

From the foregoing it will be apparent that the subject invention satisfies all of the objects set forth hereinbefore.

While the invention has been fully disclosed in a preferred embodiment, it is possible that variations in design may be made without departing from the spirit of the invention hence, the inventors reserve the right to all variations encompassed by the claims which follow:

What is claimed is:

1. A rotary orbital sander comprising in combination, a motor housing enclosing a motor means, a drive shaft rotable by the motor means, said drive shaft having an axially offset portion, a pinion gear housing affixed to the motor housing, a carried supported on the shaft offset portion by bearing means, gear means on the pinion gear housing, gear means on the carrier which mesh with the gear means of the pinion gear housing, a counter-balancing weight having a center of gravity of rotation in the same plane as the center of gravity of rotation of—the carrier, the bearing means, and a sanding pad assembly which may be affixed to the carrier—said pinion gear housing having a portion which surrounds the carrier to prevent contact of the rotating carrier with objects in close proximity to the sander and circular cavity provided in the pinion gear housing which provides rolling contact with a peripheral circular portion formed on the carrier.

2. A rotary orbital sander according to claim 1, having a handle affixed to the motor housing, passageway means in the handle for conduction of pressurized pneumatic medium to the motor means, a throttle valve for flow regulation of pneumatic medium to the motor means, and a valve means for cut off of pneumatic medium to the throttle valve.

3. A rotary orbital sander according to claim 1, wherein the number of teeth on the gear means of the pinion gear housing is greater in number than the teeth of the carrier.

4. A rotary orbital sander according to claim 1, wherein the bearing means supporting the carrier upon the shaft offset portion are in spaced parallel relation.

* * * * *